(12) United States Patent
Thorson

(10) Patent No.: US 7,503,703 B1
(45) Date of Patent: Mar. 17, 2009

(54) FERRULE FOR OPTICAL NETWORKS

(75) Inventor: Kevin J. Thorson, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/197,555

(22) Filed: Aug. 4, 2005

(51) Int. Cl.
*G02B 6/36* (2006.01)

(52) U.S. Cl. .............................. 385/71; 385/33; 385/89

(58) Field of Classification Search ........................ None
See application file for complete search history.

(56) References Cited

U.S. PATENT DOCUMENTS

| | | | |
|---|---|---|---|
| 6,033,125 A * | 3/2000 | Stillie et al. .................... | 385/75 |
| 6,045,269 A | 4/2000 | Watanabe et al. | |
| 6,062,740 A * | 5/2000 | Ohtsuka et al. ............... | 385/81 |
| 6,210,047 B1 * | 4/2001 | Grois et al. .................... | 385/83 |
| 6,398,424 B1 | 6/2002 | Jin et al. | |
| 6,453,091 B2 * | 9/2002 | Kawai .......................... | 385/33 |
| 6,761,489 B1 * | 7/2004 | Dean et al. .................... | 385/78 |
| 6,848,870 B2 | 2/2005 | Grabbe | |
| 6,886,991 B2 | 5/2005 | Endo | |
| 7,178,235 B2 * | 2/2007 | Rolston et al. ................ | 29/860 |
| 2004/0062490 A1 | 4/2004 | Gimbel et al. | |
| 2004/0105629 A1 | 6/2004 | Cheng et al. | |
| 2004/0120659 A1 | 6/2004 | Cheng et al. | |
| 2004/0247250 A1 | 12/2004 | Lee | |
| 2005/0036742 A1 | 2/2005 | Dean, Jr. et al. | |
| 2006/0093273 A1 * | 5/2006 | Fenwick et al. ............... | 385/57 |
| 2006/0115217 A1 * | 6/2006 | Childers et al. ............... | 385/53 |

* cited by examiner

*Primary Examiner*—Tina M Wong
(74) *Attorney, Agent, or Firm*—Brooks, Cameron & Huebsch, PLLC (57) ABSTRACT

One ferrule embodiment includes a number of optical fibers, an alignment fixture, and an encapsulating material. The alignment fixture has a number of apertures for placement of the ends of the number of optical fibers. The encapsulating material is formed around at least a portion of the number of optical fibers and at least a portion of the alignment fixture.

13 Claims, 5 Drawing Sheets

FERRULE FOR OPTICAL NETWORKS

FIELD OF THE INVENTION

The present disclosure generally relates to creating optical connections between sections of optical fiber in optical pathways. And, in particular, the present disclosure relates to ferrules for use in optical networks.

BACKGROUND

In optical fiber communications, optical fibers are often constructed from a number of sections each having an optical pathway formed therein. The sections are aligned end to end such that light passing through a first optical pathway section can continue traveling through the optical pathway of a second optical fiber section.

In theory, the ends are placed adjacent to each other and the light passes from one end to the next. However, in the field, the environment of the optical network can provide forces that move one optical fiber section with respect to another and, thereby, the transmission of light signals between the optical fiber sections can be attenuated or disrupted.

As such, typically, at least the ends of two adjacent optical fiber sections are attached to each other to help maintain the alignment of the optical pathway with respect to the two optical fiber sections. Ferrules have been proposed that act to connect an end of one optical fiber section to an end of another optical fiber section.

Ferrules typically aid in strengthening and maintaining the alignment of the connection between the first and second optical fiber sections through use of a rigid or semi-rigid body structure. The added rigidity can be provided by shape or size of the body, or by the materials used to manufacture the ferrule. Further, ferrules are often designed to permanently or releasably attach to each other to stabilize the interface between the two optical pathway sections.

However, when the ferrules are constructed, they are oftentimes constructed individually and without reference to the optical fibers to be positioned within the ferrule or with respect to each other. Accordingly, when positioning the optical fibers within the ferrules, the apertures for the fibers may be sized too big or too small, and may be inaccurately positioned with respect to each other.

Further, the placement of the optical fibers may be inaccurate, with fibers terminating at different positions with respect to each other and/or with their end faces angled in different directions. The placement of the individual fibers within the ferrule can also be a time consuming task because it may be difficult to see the optical fiber as it is passed through the body of the ferrule.

Additionally, since the ferrules are made without the optical fibers, the optical fibers are typically adhered into place with an adhesive. In some instances, it may be difficult to apply adhesive to the interior of the apertures to ensure proper adhesion of the optical fibers to the ferrule.

In some instances, it may be advantageous to use one or more lenses or mirrors to change the characteristics of the light signal to be transmitted through an optical pathway, among other components. Since the ends of a section already provide a break in the optical pathway, oftentimes, lenses and other structures and apparatuses are positioned at the ends of the optical sections.

These items are typically also fabricated independently from the ferrules and the optical fibers and are attached to the ferrule and/or to one or both of the optical fibers when placed in the field. Accordingly, these items similarly suffer from alignment issues and add additional physical components to the optical network.

SUMMARY

Embodiments of the present disclosure include various ferrule, optical pathway, and method embodiments for use in an optical network. Various embodiments provide a unitary design having a number of functionalities provided thereby.

Embodiments also provide alignment mechanisms to better align the optical fibers with respect to the other optical fibers mounted in a particular ferrule and with respect to optical fibers mounted in other ferrules. Some embodiments of the present disclosure reduce the number of parts that may be present at an end of an optical fiber section or within an optical communication system and reduce the form factor of the items present.

For example, in one ferrule embodiment, the ferrule includes a number of optical fibers, an alignment fixture, and an encapsulating material. In this embodiment, the alignment fixture includes a number of apertures for placement of the ends of the number of optical fibers.

The encapsulating material is formed around at least a portion of the number of optical fibers and at least a portion of the alignment fixture. By using an encapsulating material to encapsulate at least a portion of the number of optical fibers and at least a portion of the alignment fixture, the optical fibers can be aligned more accurately with respect to each other and may be better aligned with respect to optical fibers of other ferrules.

In some embodiments, the encapsulating material can encapsulate a number of the sides of the alignment fixture such as the front side and back side, and/or the top and bottom, among others. In various embodiments, the back side can be encapsulated while the front side is not. In such embodiments, the alignment fixture can, therefore, be a portion of the exterior of the housing surrounding the optical fibers encapsulated within the housing.

In some embodiments, the entire alignment fixture can be encapsulated. For example, an encapsulating material can be used to form a housing, where the alignment fixture is positioned within the housing.

In various embodiments, a portion of, or all, of the encapsulating material can be an optically transparent material. In this way, light signals can be transmitted through the encapsulating material.

Further, in some embodiments, a portion, or all, of the encapsulating material can be an optical lens material. In this way, lenses can be fabricated in the encapsulating material. Such embodiments also allow for lenses to be provided as part of a unitary ferrule body, in some embodiments. These embodiments can reduce or eliminate the amount of grinding, polishing, and/or other processes used to form a lens.

In various embodiments, the ferrule can include a structure for connection to an electrical source. For example, a number of electrical cables can be provided on the exterior of a ferrule housing (e.g., such as one constructed from an encapsulating material) or can be provided within the housing (e.g., encapsulated in the encapsulating material).

The present disclosure also includes a number of optical pathway embodiments. In some embodiments, the optical pathway includes a number of first and second optical fibers, and first and second ferrules.

The first ferrule has a number of first optical fibers, an alignment fixture, and an encapsulating material. The alignment fixture has a number of apertures for placement of the ends of the number of first optical fibers. The encapsulating material can be formed around at least a portion of the number of first optical fibers and at least a portion of the alignment fixture as discussed herein. In such embodiments, the first ferrule can include a first engagement surface.

In such embodiments, the second ferrule can be formed around at least a portion of a number of second optical fibers. The second ferrule can include a second engagement surface, and, the first and second engagement surfaces can be positioned to allow for the transmission of light signals between the one or more first optical fibers and one or more second optical fibers.

In some embodiments, the second ferrule can include a second alignment fixture having a number of apertures for placement of the ends of the number of second optical fibers. Embodiments of the present disclosure can also include first and second engagement surfaces that are formed from an optically transparent material. One or more of the first and second engagement surfaces, in such embodiments, can be formed from an optical lens material, for example. One or more lenses can be formed in the material, such as within the first and/or second engagement surfaces, for example.

Embodiments of the present disclosure can also include a second ferrule having a second alignment fixture with a number of apertures for placement of the ends of the number of second optical fibers. Such embodiments can also include an encapsulating material formed around at least a portion of the number of second optical fibers and at least a portion of the second alignment fixture.

The present disclosure also includes a number of method embodiments. Various method embodiments include aligning a number of optical fibers with respect to one another. For example, aligning a number of optical fibers with respect to one another can include attaching an end of each of the number of optical fibers to an alignment fixture. In this way, the optical fibers can be aligned with respect to each other. In some embodiments, the attached ends can be cleaved to provide a uniform length and/or end surface to the optical fibers.

Alignment fixtures can also provide better alignment with respect to the alignment between the fibers attached to the fixture and another set of fibers that are to be used to form the optical pathway. In some embodiments, ferrules each having an alignment fixture, can be used. In such embodiments, the alignment between the optical fibers attached to the two alignment fixtures may also be improved.

Such embodiments can also include applying a moldable material to encapsulate the number of optical fibers to form a ferrule body. Applying the moldable material can be accomplished by injecting the moldable material into a cavity having an inverse shape of the ferrule body, for example.

In some embodiments, applying the moldable material can include applying a thermoset material. Applying the moldable material can also include applying a chemically curable material, in some embodiments.

In such embodiments, the moldable material can be cured to harden the ferrule body. The moldable material to be applied can be a transparent and/or an optical lens material, for example. In such embodiments, the method can also include the shaping of a number of lenses on an exterior surface of the ferrule body.

Applying a moldable material to encapsulate the number of optical fibers to form a ferrule body can also include forming a ferrule body having a number of ferrule alignment structures formed therein. For example, forming a ferrule body having a number of ferrule alignment structures formed therein can include forming a number of apertures for receiving a number of alignment pins therein. In this way, when ferrules are attached together, the holes created by the mold forming around the pins, can act as an alignment structure to align one ferrule with another.

In various embodiments, and as discussed briefly above, the ends of a number of the optical fibers can be cleaved. In some cases, the cleaving of the ends can improve the transmission characteristics of a light signal entering or exiting the optical pathway section through the end. In some embodiments, the ends of the optical fibers mounted in an alignment fixture can be cleaved such that the faces of the end of the fibers are substantially flush with a surface of the alignment fixture.

DETAILED DESCRIPTION

The present disclosure includes a number of ferrule, optical pathway, and method embodiments. Embodiments of the present disclosure will now be described in relation to the accompanying drawings, which will at least assist in illustrating the various features of the various embodiments.

Figure 1A:
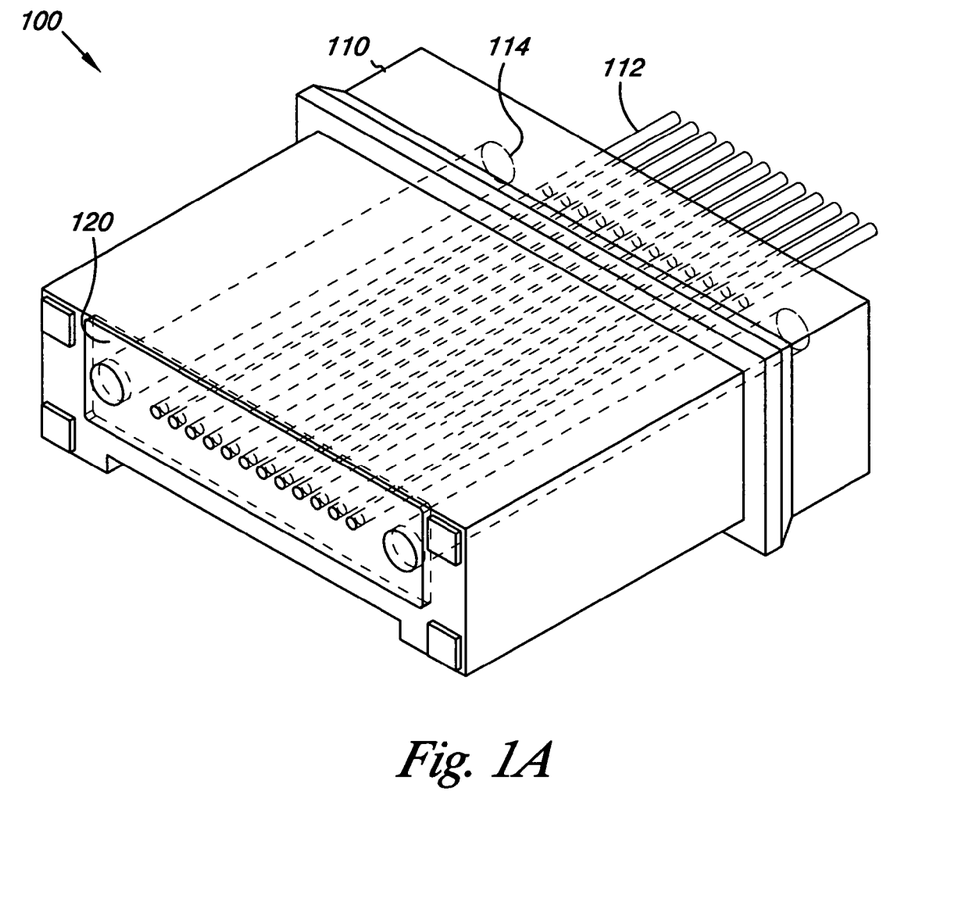
FIG. 1A is an illustration of an embodiment of a ferrule of the present disclosure.

FIG. 1A is an illustration of an embodiment of a ferrule of the present disclosure. In the embodiment illustrated in FIG. 1A, the ferrule 100 generally includes the ends of a number of optical fibers 112 encapsulated in an encapsulating material 110 to form a housing. In this embodiment, an optical fiber alignment fixture 120 and two ferrule alignment structures 114 are also provided.

The optical fiber alignment fixture 120 is positioned within the housing such that the encapsulating material 110 completely surrounds the optical fiber alignment fixture 120. However, as stated above, the optical fiber alignment fixture can be positioned such that one or more of its sides, top, and/or bottom are encapsulated.

In this embodiment, the encapsulating material 110 is optically transparent. This allows the internal workings of the ferrule 100 to be viewed from outside the housing, among other benefits. Suitable transparent materials include, but are not limited to, various silicon and polymer materials, including plastic and glass based materials, among others.

Such materials can also be the types of materials used in the fabrication of optical lenses. If an optical lens material is used, it also allows for one material to be used to fabricate both the ferrule housing and one or more lenses to be used by the optical pathways of the optical fibers 112. Such an optical lens arrangement is discussed in more detail with respect to the embodiment illustrated in FIG. 2E.

In the illustrated embodiment of FIG. 1A, the optical fiber alignment fixture 120 includes a number of apertures for the placement of the ends of a number of optical fibers 110. The optical fibers can be positioned in the apertures and, in some embodiments, can be attached to the alignment fixture. One such optical fiber alignment structure is discussed in more detail with respect to FIG. 2A.

In some embodiments, a mold for forming the ferrule can be designed to precisely place the alignment fixture in position. In this way, the interface between two ferrules can better align the optical pathway sections formed by the optical fibers of the two ferrules.

One such precision placement structure that can be used is evidenced in FIG. 1A and will be discussed in greater detail with respect to FIGS. 2A-2E. In the embodiment of FIG. 1A, the ferrule 100 utilizes a number of apertures 114 for the placement of pins used to attach two ferrules together. These apertures 114 can also be used to align the ferrules with respect to each other, thereby, also aligning the optical pathways of the optical fibers 112 with the respective optical pathways of the other ferrule.

In the embodiment of FIG. 1A, these apertures 114 can also be used to position the optical fiber alignment fixture 120. For example, during the ferrule molding process, the optical fiber alignment fixture 120 can be positioned on pins running through apertures 118 to place the optical fiber alignment fixture 120 in the proper position within the ferrule 100.

In various embodiments, additional alignment features can be used to align the optical fiber alignment fixture 120 within the ferrule. For example, the mold can include a slot formed in the mold in which the optical fiber alignment fixture 120 can be placed. The slot can be used to hold the optical fiber alignment fixture 120 in position during the molding process. Those of ordinary skill in the art will understand from reading the present disclosure that there are many ways in which to maintain the position of the optical fiber alignment fixture during the molding process and that the embodiments of the present disclosure include embodiments having such suitable structures.

Figure 1B:
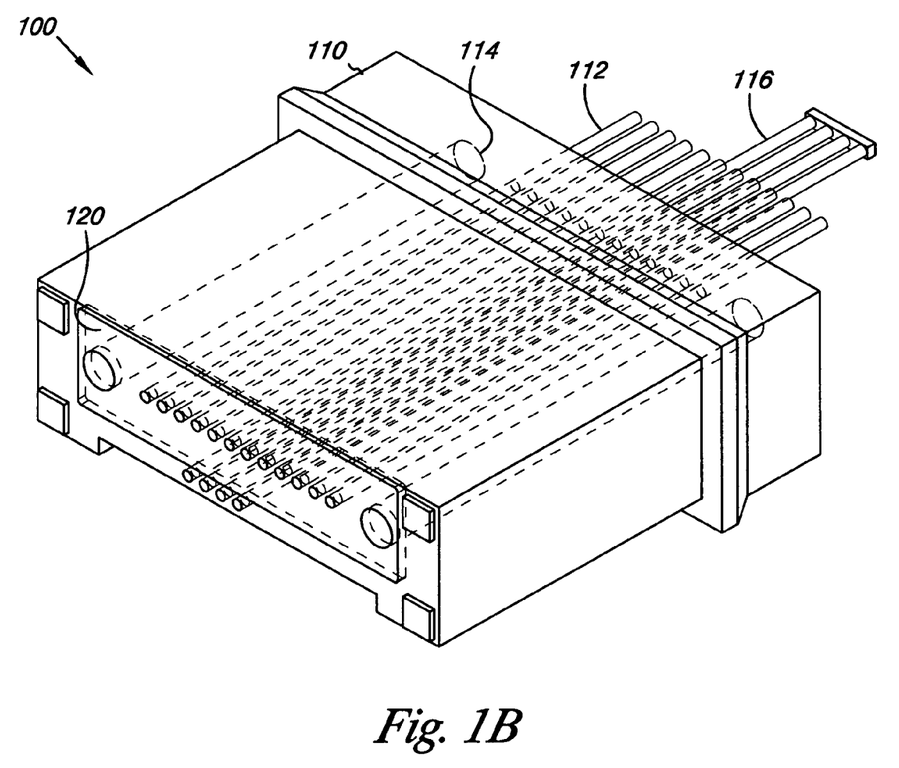
FIG. 1B is an illustration of another embodiment of a ferrule of the present disclosure.

FIG. 1B is an illustration of another embodiment of a ferrule of the present disclosure. This embodiment is similar to that of FIG. 1A, having a ferrule 100 generally including the ends of a number of optical fibers 112 encapsulated in an encapsulating material 110 to form a housing, an optical fiber alignment fixture 120, and two ferrule alignment structures 114. The embodiment of FIG. 1B also includes a number of electrical cables 116. Such embodiments allow for access to electricity at the ferrule.

The access to electricity can be useful, for example, in powering other components provided at and/or near the ferrule. For example, mirrors, sensors, and other such components can be provided at and/or near the ferrule and may use power in their operation. Such power can be provided by the one or more electrical cables 116 provided in FIG. 1B.

In some embodiments, as shown in FIG. 1B, the electrical cabling 116 can be arranged such that it can be aligned with electrical cabling on another ferrule to provide power to the other ferrule and components thereon. Such embodiments can also thereby provide an electrical conduit made up of a number of electrical cable sections coupled together with a number of ferrules.

Figure 2A:
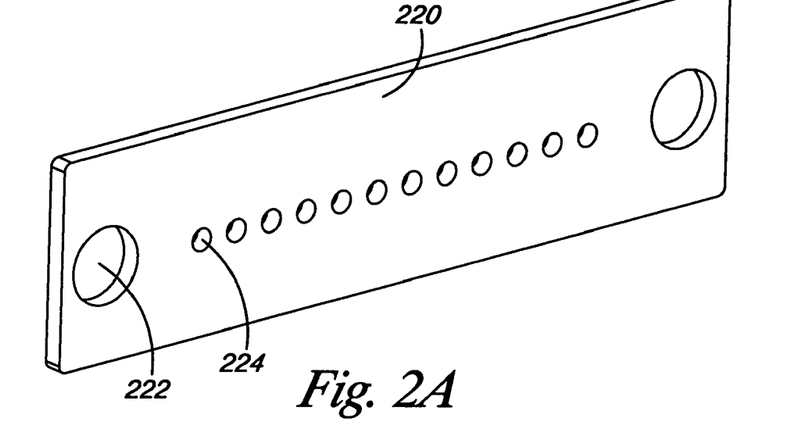
FIG. 2A is a front angled perspective illustration of an embodiment of an alignment plate of the present disclosure.

FIG. 2A is a front angled perspective illustration of an embodiment of an alignment plate of the present disclosure. In the embodiment of FIG. 2A, the optical fiber alignment fixture is a plate 220, however, other shapes may be used.

The plate 220 includes a number of apertures 222 formed therein for alignment of the plate 220 with respect to the mold for making the ferrule and, in some instances, for alignment of the housing of the ferrule. The alignment plate 220 is suitable for use in various embodiments of the present disclosure including the embodiments of FIGS. 1A and 1B, for example.

The embodiment of the plate 220 shown in FIG. 2A also includes a number of apertures 224 formed therein for placement of a portion of the ends of a number of optical fibers. The placement of the fibers is discussed in more detail with respect to FIGS. 2B-2D.

In various embodiments, the optical fibers can be permanently or releasably attached to the alignment fixture. The attachment can be accomplished in various manners. For example, suitable attachment mechanisms include; mechanical mechanisms such as frictional adhesion, and chemical mechanisms, such as adhesives, and bonding agents, among other suitable mechanisms.

The use of an alignment fixture can be beneficial because the fixture can be precision manufactured more easily than the entire ferrule. In this way, the optical fibers can be better aligned than without an alignment fixture.

Further, once the optical fibers are positioned in the alignment fixture, the tips of the optical fibers can be cleaved to provide a more uniform end surface of the optical pathway section. For example, the optical fibers can all be positioned within the alignment fixture and then one or more of the tips can be cleaved, which can provide a more similar surface on each optical fiber end. In some embodiments, this technique can reduce or eliminate other processes, such as polishing, and the like, that are often done during the assembly of a ferrule with optical fibers positioned therein.

In some embodiments, the mold used to form the ferrule can allow for precision positioning of the alignment fixture. This can allow for more uniform alignment of the optical fibers from one ferrule to another and can allow for alignment of the optical fibers mounted therein together, rather than each fiber being aligned independently.

Figure 2B:
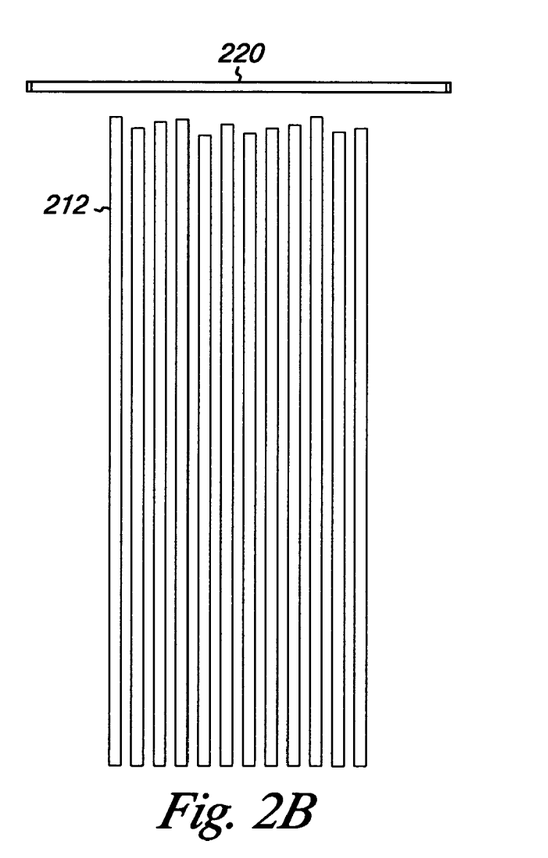
FIG. 2B is a top perspective illustration of a number of optical fibers being positioned for alignment according to an embodiment of the present disclosure.

FIGS. 2B-2E are provided to illustrate one such method for alignment and preparation of optical fibers within a ferrule. FIG. 2B is a top perspective illustration of a number of optical fibers being positioned for alignment. In FIG. 2B, the alignment fixture 220 is positioned and a number of optical fibers 212 are prepared for positioning within the apertures 224 of the alignment fixture 220.

Figure 2C:
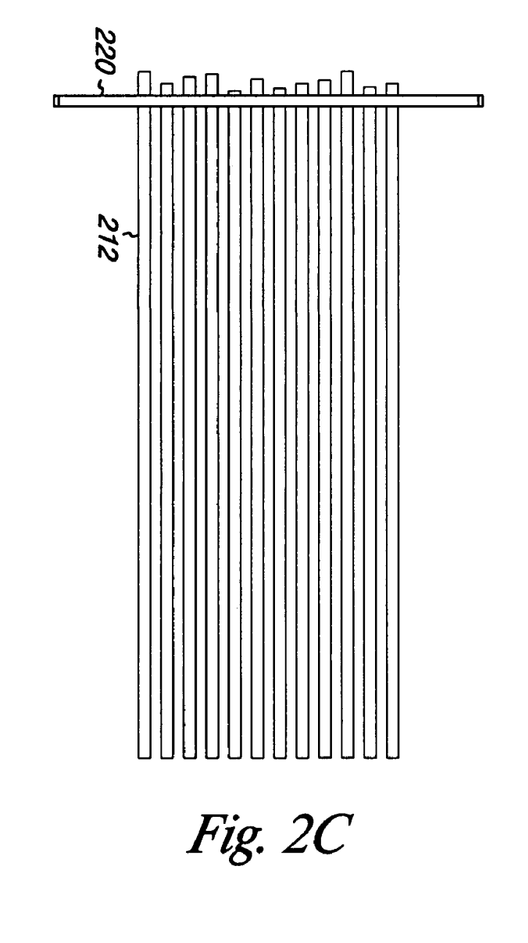
FIG. 2C is a top perspective illustration of the number of optical fibers positioned within the alignment plate an embodiment of the present disclosure.

FIG. 2C is a top perspective illustration of the number of optical fibers positioned within the alignment plate. As illustrated in the embodiment of FIG. 2C, the number of optical fibers 212 are positioned within the apertures of the optical fiber alignment fixture 220. In the embodiment illustrated in FIG. 2C, twelve optical fibers are each positioned within a different aperture (i.e., apertures 224 as shown in FIG. 2A). This embodiment would provide twelve optical pathways for the transmission of light therethrough, however, any number of fibers can be provided.

In some cases, as shown in FIG. 2C, the tips of the optical fibers 212 may be uneven when the optical fibers 212 are positioned within the apertures of the optical fiber alignment fixture 220. In such cases, the tips of the optical fibers can be changed, for example, by cleaving the ends to make them more uniform in length and/or shape, among other cutting methods and other actions that can be taken with respect to the tips. In some embodiments, the optical fibers 212 can be permanently or releasably fixed to the optical fiber alignment fixture 220 as the optical fibers 212 are positioned or once the optical fibers 212 are positioned within the apertures 224 of the optical fiber alignment fixture 220, as described above.

Figure 2D:
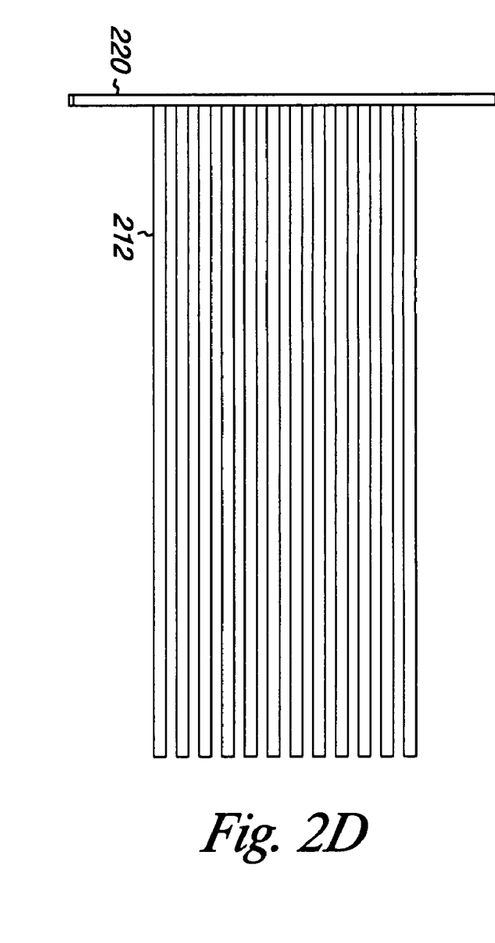
FIG. 2D is a top perspective illustration of the number of optical fibers with their ends aligned with a face of the alignment plate an embodiment of the present disclosure.

FIG. 2D is a top perspective illustration of the number of optical fibers with their ends aligned with a face of the alignment plate. In this embodiment, the tips of the optical fibers 212 have been aligned with the front surface of the optical fiber alignment fixture 220. This can be accomplished by positioning the optical fibers to be aligned in such a manner, or by cutting the optical fibers (e.g., by cleaving), for example. However, the embodiments of the present disclosure are not limited to such alignments.

Figure 2E:
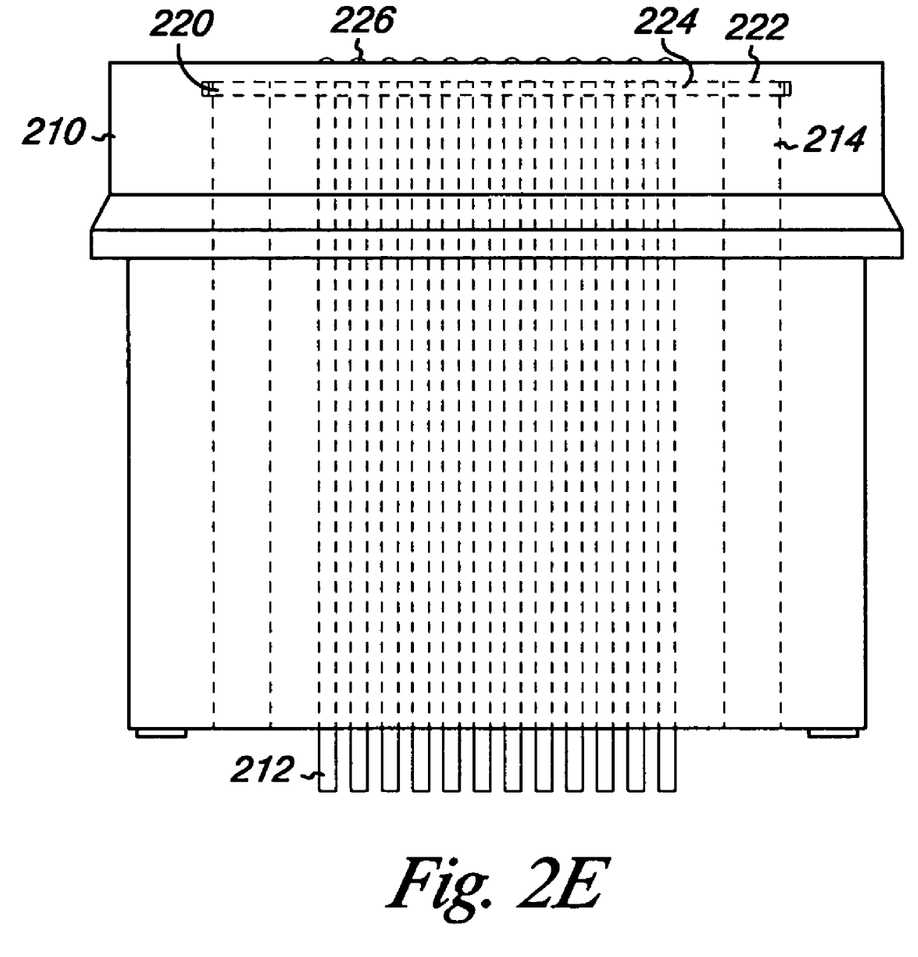
FIG. 2E is a top perspective illustration of the number of optical fibers and the alignment plate encapsulated within an encapsulating material and a number of lenses formed therein an embodiment of the present disclosure.

FIG. 2E is a top perspective illustration of the embodiment of FIG. 2D also illustrating the number of optical fibers and the alignment plate encapsulated within an encapsulating material. In this embodiment, the optical fibers 212 have been attached to the optical fiber alignment fixture 220, the ends of the optical fibers 212 have be cleaved to align their tips with each other and with the front surface of the optical fiber alignment fixture 220. The optical fiber alignment fixture 220 with the attached optical fibers 212 has then been encapsulated in encapsulating material 210 to form a housing.

The encapsulating material of the embodiment shown in FIG. 2E is a material used to form lenses. In this embodiment, a number of lenses have been formed out of the lens forming material as the material is used to form the housing. In this way, such embodiments can form a unitary body having a housing, a number of aligned optical pathways, and a number of lenses with one encapsulating material. In various embodiments, one or more of the lenses can be shaped, for example, by grinding, polishing, and/or other such processes.

The embodiment of FIG. 2E also includes a mechanism to align the optical fiber alignment fixture 220 within the mold. In this embodiment, the mechanisms are a number of apertures that are provided in the mold for alignment. The apertures can be used with alignment pins that can be positioned therein. For example, the aperture 214 can be used when aligning one ferrule with another and/or, in some instances, a ferrule with another optical component.

Additionally, in various embodiments, the encapsulating material can surround one or more sides of the optical fiber alignment fixture. For example, in the embodiment provided in FIG. 1A, the optical fiber alignment fixture is surrounded on all sides but its front face. In such an embodiment, the front face acts as a portion of the ferrule housing. In embodiments such as that shown in FIG. 2E, the optical fiber alignment fixture is surrounded on all sides.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A ferrule, comprising:
   a number of optical fibers each having an end;
   an alignment fixture having a number of apertures for placement of the ends of the number of optical fibers; and
   an encapsulating material formed around and in contact with at least a portion of the number of optical fibers and at least a portion of the alignment fixture to form an exterior portion of a ferrule body, wherein the encapsulating material and the alignment fixture form a unitary ferrule bode where at least a portion of an engagement surface for engaging another ferrule body is formed by the encapsulating material and wherein a plane parallel to the engagement surface of the ferrule passes through both the encapsulating material and the alignment fixture.

2. The ferrule of claim 1, wherein the encapsulating material encapsulates the entire alignment fixture.

3. The ferrule of claim 1, wherein the encapsulating material encapsulates at least a front side and a back side of the alignment fixture.

4. The ferrule of claim 1, wherein the encapsulating material encapsulates at least a back side of the alignment fixture.

5. The ferrule of claim 1, wherein at least a portion of the encapsulating material is oriented such that light, that passes through one or more of the ends of the number of optical fibers, passes through the encapsulating material.

6. The ferrule of claim 1, wherein the encapsulating material forms an optical lens.

7. The ferrule of claim 1, wherein the ferrule includes a structure for a connection to an electrical source.

8. An optical pathway, comprising:
   a first ferrule having;
      a number of first electrical cables each having an end;
      an alignment fixture having a number of apertures for placement of the ends of a number of first optical fibers and a number of the first electrical cables; and
      an encapsulating material formed around and in contact with at least a portion of the number of first optical fibers, at least a portion of the number of first electrical cables, and at least a portion of the alignment fixture to form an exterior portion of a ferrule body and wherein the first ferrule includes a first engagement surface, at least a portion of which is formed by the encapsulating material, and wherein a plane parallel to the first engagement surface of the first ferrule passes through both the encapsulating material and the alignment fixture;
   a second ferrule formed around at least a portion of a number of second optical fibers and a number of second electrical cables wherein the second ferrule includes a second engagement surface; and
   wherein the first and second engagement surfaces are positioned to allow for the transmission of light signals between the number of first optical fibers and the number of second optical fibers.

9. The optical pathway of claim 8, wherein the second ferrule includes a second alignment fixture having a number of apertures for placement of the ends of the number of second optical fibers.

10. The optical pathway of claim 8, wherein the first and second engagement surfaces are formed from an optically transparent material.

11. The optical pathway of claim 8, wherein at least one of the first and second engagement surfaces is formed from an optical lens material.

12. The optical pathway of claim 8, wherein at least one of the first and second engagement surfaces is formed from an optical lens material and has at least one lens formed therein.

13. The optical pathway of claim 8, wherein second ferrule includes:

a second alignment fixture having a number of apertures for placement of the ends of the number of second optical fibers; and an encapsulating material formed around at least a portion of the number of second optical fibers and at least a portion of the second alignment fixture.

* * * * *